United States Patent [19]

Van der Klashorst et al.

[11] Patent Number: 4,769,434

[45] Date of Patent: Sep. 6, 1988

[54] LIGNIN DERIVATIVE POLYMERS

[75] Inventors: Gerrit H. Van der Klashorst, Pretoria; Antonio Pizzi, Irene; Flora-Anne Cameron, Bergbron, all of South Africa

[73] Assignee: South African Inventions Development Corporation, Transvaal, South Africa

[21] Appl. No.: 875,303

[22] Filed: Jun. 17, 1986

[30] Foreign Application Priority Data

Jun. 19, 1985 [ZA] South Africa ..................... 85/4617

[51] Int. Cl.$^4$ ............................................. C08H 5/02
[52] U.S. Cl. ..................... 527/403; 527/400; 527/401; 530/500; 530/501; 530/502; 530/505
[58] Field of Search ..................... 527/400, 401, 403; 530/501, 500, 502, 505

[56] References Cited

U.S. PATENT DOCUMENTS

| | | |
|---|---|---|
| 2,168,160 | 8/1939 | Hochwalt et al. .................. 527/403 |
| 2,201,797 | 5/1940 | Scott ............................. 527/403 X |
| 2,209,289 | 7/1940 | Wallace ............................ 527/400 |
| 2,221,282 | 11/1940 | Champer et al. .............. 527/403 X |
| 2,404,840 | 7/1946 | Harvey ............................. 527/400 |
| 3,886,101 | 5/1975 | Felicetta et al. ................... 527/401 |

Primary Examiner—Earl Nielsen
Attorney, Agent, or Firm—Murray and Whisenhunt

[57] ABSTRACT

A polymer material of the product of reaction of a grass plant lignin derivative comprising lignin polymer fragments recovered from black liquor obtained in the pulping of grass plant material and containing an average of more than 0.4 sites per phenyl propane unit of the polymer fragments reactive to base catalyzed substitution and condensation reactions, with an electrophilic compound which is capable of reacting twice at one side or at least once at each of two different sites.

24 Claims, No Drawings

LIGNIN DERIVATIVE POLYMERS

This invention relates to the utilization of lignin derivatives produced as waste products in the pulping industry.

Large tonnages of such materials are produced during the chemical pulping of wood and other plant material but up to the present time they have been utilised principally only for their combustion value in the formation of an incinerator product from which pulping chemicals can be recovered. In some cases the black liquor containing the lignin derivatives and spent pulping chemical is simply discarded into rivers and the sea causing a pollution problem.

It has been proposed to utilize the lignin derivatives contained in black liquors obtained from the pulping of hardwoods and softwoods both by the sulphite and alkali pulping processes, but as yet no major commercial use of the waste products has transpired. The principal direction of investigation of uses for lignin derivatives has been in the polymer field, lignins being high molecular weight compounds formed by the biosynthetic polymerization of certain closely related phenylpropenol precursors. During pulping the lignin polymers are broken down to provide the said lignin derivatives which are by nature degradation products comprising lignin polymer fragments incorporating phenyl propane units which may present reactive sites through which re-polymerization reactions can occur.

A great deal of work has been directed at the separation of alkali lignin and lignosulphonate degradation products from black liquors, and the reaction of these with aldehydes for the formation of phenol formaldehyde type resins and adhesives. This has included the partial substitution of the phenol by the lignin derivatives, but without a satisfactory product having being achieved. It is believed that the main reason for the lack of success is the poor reactivity of the lignin polymer fragments due to the insufficient number of sites on each fragment which are reactive with formaldehyde. The poor reactivity manifests itself in unsatisfactory cross-linking in a proportion of the lignin fragments which results in poor adhesive properties.

It has also been proposed to modify the lignin derivatives by ultra filtration to remove lower molecular weight fragments and provide a residue of larger fragments having a greater number of reactive sites to each fragment. This procedure improves the quality of the resin products but the cost thereof renders the product impractical.

A further proposal has been to demethoxylate the lignin derivatives by replacing the methoxy groups with hydroxy groups which activate the 2 and 6-lignin aryl ring positions, but again the low cost effectiveness of the chemical modification procedure has excluded large scale industrial application.

It is an object of the invention to provide a black liquor lignin degradation product which, without the need for prior screening or chemical modification of the said lignin derivative, is suitably reactive to base catalyzed substitution or condensation reactions to render the lignin derivative material utilizable in polymerization reactions.

It is a further object of the invention to provide a polymer material formed from such lignin degradation products, which material exhibits acceptable polymerization properties.

According to the invention a polymerizable lignin derivative comprises lignin polymer fragments recovered from black liquor obtained in the pulping of grass plant material and containing an average of more than 0,4 sites per phenyl propane unit of the said lignin polymer fragments reactive to base catalyzed substitution and condensation reactions.

Further according to the invention, the lignin derivative is obtained from the alkali pulping, preferably soda pulping, of bagasse.

It has been found that whereas the alkali lignins and lignosulphonates of the more common wood pulps have an average of between 0,1 and 0,4 sites on the phenyl propane units reactive to base catalysed substitution reactions, such as with aldehydes, soda bagasse lignin contains an average of 0,6–0,7 such sites per phenyl propane unit. It has further been found that the greater reactivity of alkali bagasse lignins renders the product obtained from the black liquor suitable for use as a component of polymer compositions, especially those of the phenol-formaldehyde type, without the necessity of first modifying the lignins obtained from the black liquor.

Also according to the invention, a method for the production of a polymerizable lignin derivative includes the steps of treating black liquor obtained in the alkali pulping of grass plant material and in particular bagasse to precipitate hemicellulose contained therein, removing the precipitate, further treating the mother liquor to precipitate a lignin derivative material, and recovering the latter.

Alkali lignins can easily be precipitated from their spent liquors by acidification. During alkaline pulping the lignin macromolecule is degraded by cleavage of base labile ether bonds. The cleavage of aryl ether bonds results in the formation of phenols which exist as phenolate salts under the alkaline conditions during pulping and render the lignin fragments soluble. A decrease of the pH to below the pH value of the phenol reverses the dissociation of the lignin phenol groups and the lignin precipitates from the solution.

Acidification of the bagasse lignin, such as with $CO_2$ or HCl, results in a suspension of precipitated lignin and hemicelluloses which cannot be coagulated by normal methods such as heating of the suspension. The bagasse spent liquor may, however, be treated with a large quantity of methanol (or acetone or ethanol) to precipitate the hemicellulose component. After decantation of the top layer containing the dissolved lignin, and distillation under reduced pressure of the methanol, the lignin solution may be acidified to a pH of 8 to 10 using $CO_2$ or HCl, or any other acid, and the lignin coagulated in a fused lower layer by heating the suspension to temperatures between 60° C. and 120° C.

Still further according to the invention a method of forming a polymer material comprises reacting the above lignin derivative with an electrophilic compound capable of reacting twice.

Also according to the invention the polymer material is formed by reaction of the said lignin derivative, with or without prior modification, with an electrophilic compound selectd from aldehydes, ureas, phenols and isocyanates.

More particularly the alkali bagasse lignin derivative product is reacted with an aldehyde, such as formaldehyde, an electrophilic compound which reacts twice at one site, or one such as furfural which reacts at different sites, to form a phenolic aldehyde type resin.

It will be appreciated that the selected grass plant lignin derivative reactant comprises lignin polymer fragments containing phenyl propane units which have in excess of 0,4 and preferably at least 0,6 reactive sites per phenyl propane unit. The polymerization reaction is therefore in the nature of a cross-linking of the various lignin fragments by the electrophilic reactant.

Thus in accordance with a specific aspect of the invention, the soda bagasse lignin is reacted with an aldehyde to give a phenolic formaldehyde type thermoset adhesive material or a resin capable of further reaction with electrophilic compounds to provide such thermoset adhesive.

The invention also includes the utilization of mixtures of the soda bagasse lignin and a phenolic compound and an aldehyde, the lignin thereby replacing a proportion of the phenolic compound in the formation of the phenol formaldehyde type resin.

The phenolic compound will normally be phenol. However, phenol may be partially or wholly substituted by an hydroxy or amine substituted aryl compound such as a resole resin, resorcinol, cresols, tannins or melamine, aniline and other compounds. Also the phenolic compound may be partially or wholly grafted to the soda bagasse lignin derivative prior to any addition of aldehyde reactant.

The aldehyde can be formaldehyde (paraformaldehyde or formalin), furfural or any like aldehyde.

The soda bagasse lignin based phenolic formaldehyde type resin of the invention is particularly suited for use as an adhesive used in the manufacture of wood products such as particle board, plywood, glullam and fingerjoints and the like. Other products could include foams, foundry core binders and other industrial products.

The proportions of the components of the resin are not critical but do effect the strength of the adhesives. A satisfactory commercial product must accordingly be balanced in terms of quality and cost. Greater proportions of phenol and aldehyde will increase both quality and cost.

A filler may be incorporated into the resin and is preferably wood flour, nutshell flour or the like.

The physical properties of the resin adhesive of the invention, such as pot-life and viscosity, may be adapted according to the requirements of each product. Thus shelf-life may be extended by adjusting the pH of the composition to the lower end of a practical pH range of 8 to 14. The pot-life may also be lengthened by the addition of an alcohol to form acetals or hemiacetals with the aldehyde. The viscosity of the resin composition may be decreased if desired by sulphonation.

Also the resin composition could be employed wholly or partially in a fast-set adhesive as one component of a two-part honeymoon adhesive system, the other component being a commerical fast-set.

The following examples illustrate the invention:

EXAMPLE 1

Soda bagasse spent liquor (4 parts, 30% solids) was mixed with methanol (3 parts). The resulting hemicellulosic precipitate was removed by decanting the top liquid layer containing the lignin degradation product. Methanol in the decanted top layer was removed by distillation under reduced pressure and the remaining water solution was acidified with hydrochloric acid to pH 9 and the lignin coagulated by heating the mix to 60° C. The top liquid layer was then decanted and the lignin precipitate was collected as a viscous fused lower layer which was then dried at 105° C. and ground to provide a lignin derivative in powder form and comprising lignin polymer fragments having an average of 0,6–0,7 sites per phenyl propane unit reactive to base catalyzed substitution and condensation reactions.

The bagasse lignin derivative (10 g) was reacted with formaldehyde 0,60 g at 50° C. for 40 minutes. Phenol (0,94 g) and fillers (0,4 g wood flour and 0,2 g macadamia nutshell flour were used throughout) were added and the mix used to glue beech strips 25 mm×25 mm overlapped in this and other tests herein reported. The strips were cured at 100° C. for 4 hours. The resulting glued strips were tested for dry strength. In this and following examples the strength values are given in Newtons and the wood failure rates are given in brackets. The strength values were 2323 (38), soak (24 hours in water at ambient temperature) 1840 (13), boil (six hours in boiling water) 1207 (0).

EXAMPLE 2

The lignin derivative (10 g, 50% solids solution) prepared as described in example 1 was reacted with 1,2 g formaldehyde for 1,5 hours. The resulting methylolated lignin was mixed with phenol (0,9 g) and used to glue beech strips. After curing the beech strips gave strength values of dry: 1815 (13), soak 1850 (33) and boil 1300 (12).

EXAMPLE 3

A 50% solution of the lignin described in example 1 at pH 12 to pH 13, was methylolated at 40° C. for 30 minutes with formaldehyde (0,6 g on 5 g dry lignin). Phenol (0,9 g on 5 g dry lignin) was added and heating continued at 50° C. for 30 minutes. The resulting lignin-phenol mix was used in different proportions with a commercial resole phenol-formaldehyde resin as a thermosetting adhesive for beech strips. After curing at 100° C. for 4 hours the strips gave the strength values listed in Table 1.

TABLE 1

Strengths of beech strips glued with lignin-/phenol-formaldehyde resin mixtures

| # lignin resin/ phenol | # resole resin | Strength (wood failures %) | | |
|---|---|---|---|---|
| | | Dry | Soak | Boil |
| 100 | 0 | 1503 (0) | — | — |
| 80 | 20 | 1906 (13) | 760 (3) | 793 (8) |
| 70 | 30 | 2116 (24) | 1513 (6) | 1690 (53) |
| 60 | 40 | 2645 (59) | 1720 (48) | 1980 (87) |
| 50 | 50 | 2428 (83) | 1912 (87) | 1925 (87) |
| 40 | 60 | 3210 (79) | 2047 (90) | 1893 (93) |

EXAMPLE 4

A 50% solution of the lignin prepared in example 1, at pH 12 to pH 13, was methylolated at 40° C. for 30 minutes with paraformaldehyde (0,6 g on 5 g dry lignin). Phenol (0,9 g on 5 g dry lignin) was added and heating continued for 30 minutes at 50° C. The resulting mix was used together with paraformaldehyde as hardener in different proportions with a commercial resole phenol-formaldehyde resin to glue beech strips. After curing at 100° C. for 4 hours the strips gave the strength values listed in Table 2.

TABLE 2

Adhesive strengths of lignin and phenol-formaldehyde mixtures

| # lignin resin/ phenol | # resole resin | Strength (wood failures %) | | |
|---|---|---|---|---|
| | | Dry | Soak | Boil |
| 100 | 0 | 2025 (10) | 1733 (18) | 600 (7) |
| 70 | 30 | 2283 (65) | 1800 (42) | 1567 (57) |
| 60 | 40 | 2298 (68) | 1770 (87) | 1775 (97) |
| 50 | 50 | 2605 (80) | 2070 (83) | 2217 (95) |
| 40 | 60 | 3071 (91) | 2600 (100) | 2590 (100) |
| 70 | 30 | 2905 (100) | 2460 (100) | 1883 (98) |

EXAMPLE 5

Methylolated lignin as used in example 3 together with resorcinol or a commercial coldset adhesive was tested as a thermosetting adhesive on beech strips.

TABLE 3

| Entry | % Resorcinol (res) commercial coldset & hardener added | Strength (wood failures %) | | |
|---|---|---|---|---|
| | | Dry | Soak | Boil |
| 1 | Res 13%, $H_2CO$ (14%) | 2305 (49) | 1870 (97) | 1773 (93) |
| 2 | Res 13%, $H_2CO$ (20%) | 3338 (33) | 2473 (95) | 1872 (82) |
| 3 | Commercial coldset + $H_2CO$ (10%) | 2597 (8) | 2243 (33) | 2015 (20) |

EXAMPLE 6

Methylolated lignin as used in example 3 was used to substitute 50% of component B of a commercial fast set adhesive to prepare acceptable fingerjoints. The joints were cured at ambient temperature for 7 days and tested according to SABS 970 1976.

The strength (and wood failure) values were:
Dry 3233 (100), soak 2270 (98) and boil 2510 (98).

EXAMPLE 7

Methylolated lignin, used in example 3, was reacted with resorcinol (0,32 g on 1 g dry lignin) at 50° C. for 30 minutes. The resulting resorcinol grafted lignin had a pH of 9,5. To 10 g of the above mix paraformaldehyde (1,15 g) was added and the mix immediately used to glue a fingerjoint (gel time 15 minutes). After 7 days at ambient temperature the fingerjoints were tested according to SABS method 9701976 to give dry strength 2803 (86), soak 2445 (75) and boil 2233 (100). To a second 10 g portion of the resorcinol grafted lignin 1,0 ml methanol was added whereafter paraformaldehyde (1,15 g) was added and the mix used as a coldset adhesive to prepare a fingerjoint with strength after 7 days at ambient temperature: dry 2560 (100), 2060 (90), 2010 (80). The gel time of the latter mix was approximately 80 minutes.

EXAMPLE 8

Resorcinol grafted lignin used in example 7 was used as a two component fast set fingerjoint adhesive. Part 1 was the above lignin (5 g) at pH=9,0 with methanol (0,1 g) and paraformaldehyde (1,1 g) which had a gel time of 51 minutes. Part B was the resorcinol grafted lignin at pH=12,6. The two parts were each applied to one side of a fingerjoint and the sides were matched and clamped for 24 hours. After 7 days the fingerjoints gave strength values, SABS 9701976, of dry 1933 (82), soak 1383 (40) and boil 2238 (97).

EXAMPLE 9

Particleboards were prepared using *Eucalyptus grandis* core chips oven dried for 24 hours at 50° C. to give a moisture content of 3%. One and a half kilograms of chips were placed in a laboratory blender and the adhesive sprayed, with compressed air, through nozzles to obtain 10% resin solids on oven dry chips.

Two boards were made by weighing out 860 g of furnished chips per board to result in a density after pressing of 0,700±0,02 g/cm³, and spreading the chips in a frame 300 mm×300 mm. The mat thus formed was pressed to 12 mm thickness at a press temperature of 175° C., pressure of 35 kg/cm² and a pressing time of 7½ minutes. The boards were hot stacked for 24 hours before testing.

Test samples 50 mm×12 mm, were cut from the boards for the determination of the transverse tensile strength (I.B.), which for exterior boards were measured dry, after 6 hours in boiling water (96° C.) and 24 hours soaking in cold water (23° C.). [For interior boards, samples are only tested dry.] Three test samples from each of the duplicate boards were used for each test, and test results are therefore the average of 6 determinations. Such results are set out in Table 4.

A lignin-formaldehyde resin was prepared by using a 40% lignin powder solid solution in water at pH 12 which was reacted with 9% paraformaldehyde (96%) on lignin solution under continual stirring at 50° C. for 5 hours. The lignin-formaldehyie resin (LF) had a solids content of 44%. All pH adjustments were made with a 40% solution of sodium hydroxide in water.

The adhesive was prepared using 50 parts of LF solids and 50 parts of a commercial phenol-formaldehyde resin powder to which 5 parts of paraformaldehyde was added and enough water to provide the required moisture content of the chips before pressing. After thorough mixing, the pH was adjusted to 12,8.

This is adhesive No. 1 in Table 4.

This adhesive complies with the dry strength requirements of the South African Bureau of Standards, standard specifications 1300-1980 "Particle Board: Exterior and flooring type" and 1301-1980 "Particle Board: Interior type".

EXAMPLE 10

Particleboards were prepared and tested as described in Example 9 and the lignin-formaldehyde (LF) resin used was the same as detailed in Example 9.

The adhesive was prepared using 67 parts of LF resin solids and 33 parts of commercial PF resin with 6,7 parts of paraformaldehyde (96%). Enough water was added to reach the required moisture content of the chips before pressing and after stirring well, the pH was adjusted to 12,8.

This is adhesive 2 of which the results are listed in Table 4.

The boards made with this adhesive have dry transverse tensile strength (I.B.) results which comply with both SABS 1300 "Particleboard: Exterior and Flooring Type" and 1301 "Particleboard Interior type" 1980. The exterior properties are also good.

EXAMPLE 11

Particleboards were prepared and tested as described in Example 9 and the lignin-formaldehyde (LF) resin used was the same as detailed in Example 9.

The adhesive was prepared using 80 parts of LF resin solids, 20 parts solids, of a commercial urea-formaldehyde (UF) resin, and 8,0 parts of paraformaldehyde (96%). Enough water was added to reach the required moisture content of the chips before pressing and after stirring well, the pH was adjusted to 13,0.

This is adhesive No. 3 in Table 4.

The boards made with this adhesive have dry tensile strength (IB) results which comply with the SABS specification 1301-1980. "Particle Board: Interior type".

EXAMPLE 12

Particleboards were prepared and tested as described in Example 9 and the lignin-formaldehyde resin used was the same as detailed in Example 9.

The adhesive consisted of 100 parts of LF solids with 10 parts of paraformaldehyde (96%) and enough water to reach the required moisture content of the chips before pressing. After thorough mixing, the pH was adjusted to 13,0.

This is adhesive No. 4 in Table 4.

The boards made with this adhesive have dry transverse tensile strength results which comply with the SABS standard specification 1301-1980 "Particleboard: Interior type".

EXAMPLE 13

Particleboards were prepared and tested as described in Example 9 and the lignin-formaldehyde resin used was the same as detailed in Example 9.

The adhesive consisted of wattle tannin extract in spray-dried powder form used as a solution of 55% tannin solids in water and mixed with LF resin in the ratio of 50 parts tannin extract solids to 50 parts of LF resin solids and 5 parts of paraformaldehyde (96%). Enough water was added to reach the required moisture content of the chips before pressing and after thorough mixing, the pH was adjusted to 12,9.

This is adhesive No. 5 in Table 4.

The boards made with this adhesive have dry transverse tensile strength (IB) which satisfy the requirement of both SABS standard specifications 1300-1980 "Particle Board: Exterior and flooring" and 1301-1980 "Particle Board: Interior type".

EXAMPLE 14

Particleboards were prepared and tested as described in Example 9 and the lignin-formaldehyde resin used was the same as detailed in Example 9.

The adhesive consisted of wattle tannin extract as detailed in Example 13 mixed in a ratio of 33 parts of tannin extract solids with 67 parts of LF solids and 6,7 parts of paraformaldehyde (96%). Enough water was added to reach the required moisture content of the chips before pressing and after thorough mixing, the pH was adjusted to 12,9.

This is adhesive No. 6 in Table 4.

The boards made with this adhesive have dry transverse tensile strengths (IB) which satisfy the requirements of both SABS standard specifications 1300-1980 "Particleboard: Exterior and flooring" and 1301-1980 "Particleboard: Interior type".

EXAMPLE 15

Particleboards were prepared and tested as described in Example 9 and the lignin-formaldehyde resin used was the same as detailed in Example 9.

The adhesive consisted of 100 parts of LF solids and 10 parts of paraformaldehyde (96%) mixed with enough water to provide the required moisture content of the chips before pressing and with the pH adjusted to 13,0. 5 Parts of wattle tannin extract powder was added to the dry chips in the blender and the liquid adhesive then applied through the nozzles as described in Example 9.

This is adhesive No. 7 in Table 4.

The boards made with this adhesive have dry transverse tensile strengths (IB) which satisfy the requirements of both SABS standard specifications 1300-1980 "Particleboard: Exterior and flooring" and 1301-1980 "Particlesboard: Interior type".

EXAMPLE 16

In order to assess the suitability of lignin resins as thermosetting or cold-setting structural or non-structural wood adhesive test samples of European Beech (*Fagus sylvatica*) were prepared according to the method prescribed in standard method 1029 of the South African Bureau of Standards' code of practice for the terminology and classification of adhesives for wood, SABS 0183-1984 and the British Standards Institution BS1204: Part 2: 1979 "Synthetic resin adhesives (phenolic and aminoplastic) for wood" Part 2 "Specification for close-contact adhesives".

In this test method, the adhesive is applied to a 25 mm×25 mm area of 2 strips of beech wood 3,2 mm thick×25 mm wide×115 mm long. A 5 minute open assembly time is allowed before the strips are clamped at a pressure of 800 kpa on the glue-line.

The adhesive is then allowed to cure at 90° C. and 12% equilibrium moisture content of the wood (86% relative humidity) for 4 hours before testing.

The test samples are then clamped in specially constructed jaws in a tensile testing machine and the strength required to break the test piece is recorded in kilonewtons (tensile strength).

The percentage wood failure is also determined. This is a subjective assessment as to whether the adhesion in the glue-line is stronger than the wood expressed as the amount by which the wood has failed as a percentage of the glue-line area.

For exterior adhesives, testing is done dry, after 24 hours soaking in cold water (23° C.) and 6 hours in boiling water (96° C.). Five samples are prepared for each test and average results are therefore of 5 readings.

A thermosetting adhesive was prepared using lignin-formaldehyde resin detailed in Example 9 mixed with Melamine ($C_3N_6H_6$) in mole ratios of 1 mole lignin to 1 mole melamine, 1 mole lignin to 2 moles melamine and 1 mole lignin to 3 moles melamine, together with 11% paraformaldehyde on total LF resin.

This is adhesive 8 of Table 5.

At all the molar ratios, the adhesive is suitable for use as a fully exterior structural adhesive according to British Standard 1204: Part 2 : 1979. [24 hour soak: 2,22 KN; 6 hour boil 1,45 kN.)

EXAMPLE 17

Test samples were prepared as detailed in Example 16.

The thermosetting adhesive consisted of LF resin described in Example 9 mixed with a commercial urea-formaldehyde resin in the mole ratios of (lignin:UF) 1:1; 1:2 and 1:3; mixed with 11% paraformaldehyde on total LF resin solids.

This is adhesive 9 in Table 5.

EXAMPLE 18

Test samples were prepared as detailed in Example 16.

The thermosetting adhesive consisted of LF resin described in Example 9 mixed with a commercial Melamine-urea-formaldehyde (MUF) resin in molar ratios lignin: MUF of 1:1; 1:2 and 1:3; mixed with 11% paraformaldehyde (96%) on total LF resin.

This is adhesive No. 10 in Table 5.

Lignin formaldehyde resin was prepared as described in Example 9. A mixture of 8,3 parts resorcinol and 9,4 parts of Methanol was added to 50 parts of LF resin and stirred at 50° C. for 30 minutes and cooled immediately. The pH of the mixture was 10,2. The adhesive was prepared from 50 parts of this mixture to which 7 parts of paraformaldehyde (96%), 1,4 parts of 200 mesh wood flour and 0,7 parts of Macadamia Nut-shell flour was added. The pot-life of the adhesive mixture was 11 minutes.

TABLE 4
PARTICLEBOARD TEST RESULTS

| ADHESIVE NO. | MOISTURE CONTENT (%)* | DRY IB (MPa) MEAN | DRY IB (MPa) S.D. | BOIL IB (MPa) MEAN | BOIL IB (MPa) S.D. | SOAK IB (MPa) MEAN | SOAK IB (MPa) S.D. |
|---|---|---|---|---|---|---|---|
| 1. | 16,4 | 0,79 | 0,081 | 0,21 | 0,050 | 0,25 | 0,033 |
| 2. | 12,6 | 0,68 | 0,069 | 0,20 | 0,034 | 0,24 | 0,064 |
| 3. | 13,0 | 0,52 | 0,071 | — | — | — | — |
| 4. | 13,4 | 0,52 | 0,049 | — | — | — | — |
| 5. | 13,2 | 0,65 | 0,023 | 0,20 | 0,036 | 0,23 | 0,025 |
| 6. | 12,8 | 0,60 | 0,042 | 0,19 | 0,032 | 0,20 | 0,041 |
| 7. | 11,6 | 0,56 | 0,117 | — | — | — | — |

*Refers to moisture content at the time of pressing

TABLE 5
PROPERTIES OF THERMOSETTING LIGNIN ADHESIVES
BEECH STRIP TEST RESULTS

| ADHESIVE NO. | MOLAR RATIO Lignin 1:1 DRY Strength (kN) | Wood failure (%) | 24 HOUR SOAK Strength (kN) | Wood failure (%) | 6 HOUR BOIL Strength (kN) | Wood failure (%) | MOLAR RATIO Lignin 1:2 DRY Strength (kN) | Wood failure (%) | 24 HOUR SOAK Strength (kN) | Wood failure (%) | 6 HOUR BOIL Strength (kN) | Wood failure (%) |
|---|---|---|---|---|---|---|---|---|---|---|---|---|
| 8 | 2,97 | 100 | 2,25 | 98 | 0,67 | 2 | 3,15 | 100 | 2,17 | 100 | 1,07 | 15 |
|   | 0,163 | 0,00 | 0,300 | 2,89 | 0,087 | 2,89 | 0,329 | 0,00 | 0,391 | 0,00 | 0,097 | 5,00 |
| 9 | 2,55 | 85 | 1,49 | 2 | 0 | 0 | 2,83 | 100 | 1,62 | 35 | 0 | 0 |
|   | 0,144 | 11,55 | 0,659 | 2,89 | 0,00 | 0,00 | 0,260 | 0,00 | 0,074 | 13,23 | 0,00 | 0,00 |
| 10 | 2,73 | 85 | 1,80 | 70 | 0,40 | 0 | 2,95 | 100 | 2,00 | 65 | 0,89 | 10 |
|   | 0,156 | 10,32 | 0,435 | 3,00 | 0,100 | 0,00 | 0,285 | 0,00 | 0,232 | 5,27 | 0,124 | 2,89 |

| ADHESIVE NO. | MOLAR RATIO Lignin 1:3 DRY Strength (kN) | Wood failure (%) | 24 HOUR SOAK Strength (kN) | Wood failure (%) | 6 HOUR BOIL Strength (kN) | Wood failure (%) | |
|---|---|---|---|---|---|---|---|
| 8 | 2,70 | 100 | 2,73 | 93 | 1,45 | 28 | Mean |
|   | 0,445 | 0,00 | 0,157 | 2,89 | 0,015 | 2,89 | S.D. |
| 9 | 2,62 | 100 | 2,14 | 97 | 0 | 0 | Mean |
|   | 0,255 | 0,00 | 0,200 | 5,77 | 0,00 | 0,00 | S.D. |
| 10 | 2,73 | 100 | 2,35 | 100 | 1,20 | 15 | Mean |
|   | 0,240 | 0,00 | 0,172 | 0,00 | 0,073 | 2,89 | S.D. |

EXAMPLE 19

Beech strip test samples were prepared as detailed in Example 16 to assess the suitability of lignin adhesive for use as a cold-setting adhesive.

The results are shown as adhesive No. 11 in Table 6, together with the SABS 0183-1981 specification for class 1 exterior-grade structural adhesives and BS 1204-1965, part 2 specification for synthetic adhesives for wood, marine grade.

PROPERTIES OF EXAMPLE 19
TABLE 6

| | DRY TEST Strength (kN) | Wood Failure (%) | 24 HOUR COLD WATER SOAK (23° C.) Strength (kN) | Wood Failure (%) | 6 HOUR BOIL Strength (kN) | Wood Failure (%) |
|---|---|---|---|---|---|---|
| ADHESIVE NO 11 MEAN | 3,34 | 33,00 | 2,47 | 95 | 1,87 | 82 |
| S.D. | 0,332 | 26,30 | 0,222 | 5 | 0,333 | 27,54 |

TABLE 6-continued

|  | DRY TEST | | 24 HOUR COLD WATER SOAK (23° C.) | | 6 HOUR BOIL | |
|---|---|---|---|---|---|---|
|  | Strength (kN) | Wood Failure (%) | Strength (kN) | Wood Failure (%) | Strength (kN) | Wood Failure (%) |
| SABS - 0183 - 1981 | 2,500 | — | 2,20 | 75 | 1,50 | 75 |
| B.S. 1204 | — | — | 2,22 | — | 1,45 | — |

EXAMPLE 20

Duplicate plywood panels were prepared using the adhesive system detailed in Example 10. Each panel consisted of 5 plys of Okoumè veneer 1 mm thick. With an area 30 cm × 30 cm, the veneers were conditioned to 8% equilibrium moisture content. The veneers were placed on a laboratory balance and the amount of adhesive required to give a single glue line spread of 180 g/m² was applied to each surface to be joined and evenly spread with a glue-roller. After a closed assembly time of 1 hour, the panels were pressed at 125° C. and 1,37 MPa for 7½ minutes. After manufacture, the panels were hot-stacked for 24 hours before being trimmed and cut into 4 test specimens 12,5 cm × 12,5 cm. Three squares from each panel were used for testing, 1 dry, 1 after 24 hours soaking in cold water (23° C.) and 1 after 6 hours soaking in cold water. The panels were subjected to the knife test as described in British Standard B.S. 1088-1957 and evaluated accordingly, in which a rating of 0 indicates complete glue failure and a rating of 10 complete wood failure. To comply with the specification, no glue-line should have an overall quality of less than 2 and the average value for all the glue-lines tested should not be less than 5.

The average values for the duplicate panels are shown in Table 7.

The boards comply with the specification for exterior structural grade plywood.

PROPERTIES OF EXAMPLE 20
TABLE 7

|  | DRY TEST | | 24 HOUR COLD WATER SOAK (23°) | | 6 HOUR BOIL | |
|---|---|---|---|---|---|---|
|  | Outer | Inner | Outer | Inner | Outer | Inner |
| Adhesive No. 2 | 7 | 7 | 6 | 7 | 8 | 6 |

Many embodiments of the invention exist apart from the examples given below above. It is, for instance anticipated that the lignin derivative product of the invention may be polymerized in reactions other than the phenol formaldehyde type. One such reaction would be with polyisocyanates in the formation of polyurethane type polymers. The lignins can also be polymerized with melamine, urea or urea aminoplast resins such as may be prepared with formaldehyde in varying proportions.

We claim:

1. A method of forming a polymer material, comprising reacting a grass plant lignin derivative comprising lignin polymer fragments recovered from black liquor obtained in the pulping of grass plant material and containing an average of more than 0.4 sites per phenyl propane unit of the lignin polymer fragments reactive to base catalyzed substitution and condensation reactions, with an electrophilic compound which is capable of reacting twice at one site or at least once at each of two different sites of the compound.

2. The method of claim 1 in which the lignin derivative is recovered from the black liquor obtained in the alkali pulping of grass plant material.

3. The method of claim 2 in which the lignin derivative is recovered from the black liquor obtained in the soda pulping of grass plant material.

4. The method of claim 3 in which the lignin derivative is recovered from the black liquor obtained in the pulping of bagasse and contains an average of at least 0.6 sites per phenyl propane unit reactive to base catalyzed substitution and condensation reactions.

5. The method of claim 1 in which the lignin derivative is reacted with an electrophilic compound selected from aldehydes, hydroxymethylated amines, phenolic compounds and isocyanates.

6. The method according to claim 5 in which the lignin derivative is reacted with an aldehyde selected from formaldehyde, paraformaldehyde and furfural.

7. The method according to claim 1 in which the lignin derivative comprises one of two or more further reactants reacted with said electrophilic compound.

8. The method of claim 7 in which the further reactants are selected from phenolic compounds, amines, and isocyanates.

9. The method of claim 1 in whcih the lignin derivative is reacted with the electrophilic compound to provide a resin capable of further reaction with an electrophiliccompound to provide a resin capable of further reactin with an eletraphilic compound to provide a thermoset material:

10. The method of claim 9 in which the resin is further reacted with a compound selected from aldehydes, amines, phenolic compounds and isocyanates.

11. The method of claim 9 in which a soda bagasse lignin derivative is reacted with an aldehyde to give a phenolic formaldehyde type resin.

12. The method of claim 11 in which the soda bagasse lignin is reacted with a phenolic compound and an aldehyde to provide a phenolic aldehyde type thermoset adhesive.

13. The method of claim 12 in which the phenolic compound is selected from phenol and an hydroxy substituted aryl compound.

14. The method of claim 13 in which the hydroxy substituted aryl compound is selected from resole resins, resorcinol, cresols and tannins.

15. The method of claim 9, wherein said electrophilic compound is selected from an amine substituted aryl compound, a urea and a hydroxymethylated mono or poly urea.

16. The method of claim 15, wherein the amine substituted aryl compound is selected from melamine, aniline and hydroxymethylated amine substituted aryl compounds and the hydroxymethylated mono or poly urea is selected from urea formaldehyde resins.

17. A polymer material comprising the product of reaction of a grass plant lignin derivative comprising lignin polymer fragments recovered from black liquor obtained in the pulping of grass plant material and containing an average of more than 0.4 sites per phenyl propane unit of the lignin polymer fragments reactive to base catalyzed substitution and condensation reactions, with an electrophilic compound which is capable of reacting twice at one site or at least once at each of two different sites of the compound.

18. The polymer material of claim 17 in which the lignin derivative is recovered from the black liquor obtained in the alkali pulping of grass plant material.

19. A polymer material of claim 18 in which the lignin derivative is recovered from the black liquor obtained in the soda pulping of grass plant material.

20. A polymer material of claim 19 in which the lignin derivative is recovered from the black liquor obtained in the pulping of bagasse and contains an average of at least 0.6 sites per phenyl propane unit reactive to base catalyzed substitution and condensation reactions.

21. The polymer material of claim 17 in which the lignin derivative is reacted with an aldehyde to provide a phenolic aldehyde type resin capable of further reaction with an electrophilic compound to provide a thermoset polymer.

22. The polymer material of claim 17 in which the lignin derivative comprises one of two or more reactants reacted with the said electrophilic compound.

23. A two part adhesive system, one part of which comprises the polymer material of claim 17 or claim 21.

24. An adhesive formed from a polymer material according to claim 17, 18, 19, 20, 21 or 22.

* * * * *